United States Patent
Nordquist et al.

(10) Patent No.: US 8,074,224 B1
(45) Date of Patent: Dec. 6, 2011

(54) MANAGING STATE INFORMATION FOR A MULTI-THREADED PROCESSOR

(75) Inventors: Bryon S. Nordquist, Santa Clara, CA (US); Brett W. Coon, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1380 days.

(21) Appl. No.: 11/311,963

(22) Filed: Dec. 19, 2005

(51) Int. Cl.
*G06F 9/46* (2006.01)
*G06F 9/40* (2006.01)
*G06F 15/76* (2006.01)

(52) U.S. Cl. ........... 718/104; 718/106; 712/20; 712/31; 712/34; 712/215

(58) Field of Classification Search .................. None
See application file for complete search history.

(56) References Cited

U.S. PATENT DOCUMENTS

| | | | |
|---|---|---|---|
| 5,630,116 A * | 5/1997 | Takaya et al. ............ | 1/1 |
| 6,286,027 B1 * | 9/2001 | Dwyer et al. ............ | 718/107 |
| 6,897,871 B1 * | 5/2005 | Morein et al. ............ | 345/501 |
| 6,907,517 B2 * | 6/2005 | Ohsawa et al. ............ | 712/216 |
| 2002/0174318 A1 * | 11/2002 | Stuttard et al. ............ | 712/13 |
| 2003/0126415 A1 * | 7/2003 | Okawa et al. ............ | 712/228 |
| 2005/0251649 A1 * | 11/2005 | Yamazaki ............ | 712/20 |

OTHER PUBLICATIONS

Garg et al., Architectural SUpport for Inter-Stream COmmunication in a MSIMD System, IEEE, 1995, pp. 348-357.*

* cited by examiner

*Primary Examiner* — Meng An
*Assistant Examiner* — Abdullah Al Kawsar
(74) *Attorney, Agent, or Firm* — Kilpatrick Townsend & Stockton LLP

(57) ABSTRACT

Embodiments of the present invention facilitate dynamically adapting to state information changes in a graphics processing environment. In one embodiment, a master register holds state information corresponding to units of work (threads) to be performed. The state information in the master register is copied to a per-group state register when a group of threads is to be launched. The per-group state register is coupled to processing engines configured to process the threads, so that the processing engines read state information from the per-group state register rather than the master register. In another embodiment, a number of master registers may be used to store state information for different types of threads.

13 Claims, 6 Drawing Sheets

MANAGING STATE INFORMATION FOR A MULTI-THREADED PROCESSOR

BACKGROUND OF THE INVENTION

The present invention relates in general to parallel data processing, and in particular to managing state information for a multi-threaded processor.

Parallel processing techniques enhance throughput of a processor or multiprocessor system when multiple independent computations need to be performed. A computation can be divided into tasks, with each task being performed as a separate thread. (As used herein, a "thread" refers generally to an instance of execution of a particular program using particular input data.) Parallel threads are executed simultaneously using different processing engines.

Numerous existing processor architectures support parallel processing. The earliest such architectures used multiple discrete processors networked together. More recently, multiple processing cores have been fabricated on a single chip. These cores are controlled in various ways. In some instances, known as multiple-instruction, multiple data (MIMD) machines, each core or processor independently fetches and issues its own instructions to its own processing engine (or engines). In other instances, known as single-instruction, multiple-data (SIMD) machines, a core or group of processors has a single instruction unit that issues the same instruction in parallel to multiple processing engines (or multiple processors), which execute the instruction on different input operands. SIMD machines generally have advantages in chip area (since only one instruction unit is needed) and therefore cost; the downside is that parallelism is only available to the extent that multiple instances of the same instruction can be executed concurrently.

Graphics processors have used very wide SIMD architectures to achieve high throughput in image-rendering applications. Such applications generally entail executing the same programs (vertex shaders or pixel shaders) on large numbers of objects (vertices or primitives). Since each object is processed independently of all others using the same sequence of operations, a SIMD architecture provides considerable performance enhancement at reasonable cost. Typically, a GPU includes one SIMD core (e.g., 200 threads wide) that executes vertex shader programs, and another SIMD core of comparable size that executes pixel shader programs. In high-end GPUs, multiple sets of SIMD cores are sometimes provided to support an even higher degree of parallelism.

These designs have several shortcomings. First, the separate processing cores for vertex and pixel shaders are separately designed and tested, often leading to at least some duplication of effort. Second, the division of the graphics processing load between vertex operations and pixel operations varies greatly from one application to another. As is known in the art, detail can be added to an image by using many small primitives, which increases the load on the vertex shader core, and/or by using complex texture-mapping and pixel shading operations, which increases the load on the pixel shader core. In most cases, the loads are not perfectly balanced, and one core or the other is underused. For instance, in a pixel-intensive application, the pixel shader core may run at maximum throughput while the vertex core is idle, waiting for already-processed vertices to move into the pixel shader stage of the pipeline. Conversely, in a vertex-intensive application, the vertex shader core may run at maximum throughput while the pixel core is idle, waiting for new vertices to be supplied. In either case, some fraction of available processing cycles are effectively wasted.

It would therefore be desirable to provide systems and methods wherein a GPU can dynamically adapt to changing pixel and vertex shader requirements.

BRIEF SUMMARY OF THE INVENTION

Embodiments of the present invention facilitate dynamically adapting to state information changes in a graphics processing environment. In one embodiment, a master register holds state information corresponding to units of work (threads) to be performed. The state information in the master register is copied to a per-group state register when a group of threads is to be launched. The per-group state register is coupled to processing engines configured to process the threads, so that the processing engines read state information from the per-group state register rather than the master register. In another embodiment, a number of master registers may be used to store state information for different types of threads.

In one embodiment of the present invention, a multi-threaded processing core processes data. The multi-threaded processing core includes a number of processing engines, a master register, and a per-group state register. The processing engines are configured to execute a thread group. The master register is configured to store and update state information. The per-group state register is coupled to the master register, and the state information is copied to the per-group state register from the master register during a creation of a new thread group. During execution of the new thread group, the processing engine reads the state information from the per-group state register.

According to another embodiment of the present invention, a multi-threaded processing core includes a number of processing engines, a number of master registers, and a number of per-group state registers. The processing engines are configured to execute thread groups. The master registers are configured to store and update state information for different thread types. The per-group state registers are coupled to the master registers, and the state information stored in one of the master registers is copied to one of the per-group state registers during a creation of a new thread group. During execution of the new thread group, the processing engine reads the state information from one of the per-group state registers.

According to still another embodiment of the present invention, a method of processing data includes receiving state information defining a data processing context, storing the state information in a master register, forwarding the state information from the master register to a first per-group state register during a creation of a first thread group, and executing the first thread group by a group of processing engines. During execution of the thread group, the processing engines read the state information from the first per-group state register.

According to another embodiment of the present invention, the method of processing data also includes forwarding the updated state information to a second per-group state register during a creation of a second thread group. In this embodiment, the second thread group is executed concurrently with the first thread group.

The following detailed description together with the accompanying drawings will provide a better understanding of the nature and advantages of the present invention.

DETAILED DESCRIPTION OF THE INVENTION

Embodiments of the present invention facilitate dynamically adapting to state information changes in a graphics processing environment. In one embodiment, a master register holds state information corresponding to units of work (threads) to be performed. The state information in the master register is copied to a per-group state register when a group of threads is to be launched. The per-group state register is coupled to processing engines configured to process the threads, so that the processing engines read state information from the per-group state register rather than the master register. In another embodiment, a number of master registers may be used to store state information for different types of threads.

System Overview

Figure 1:
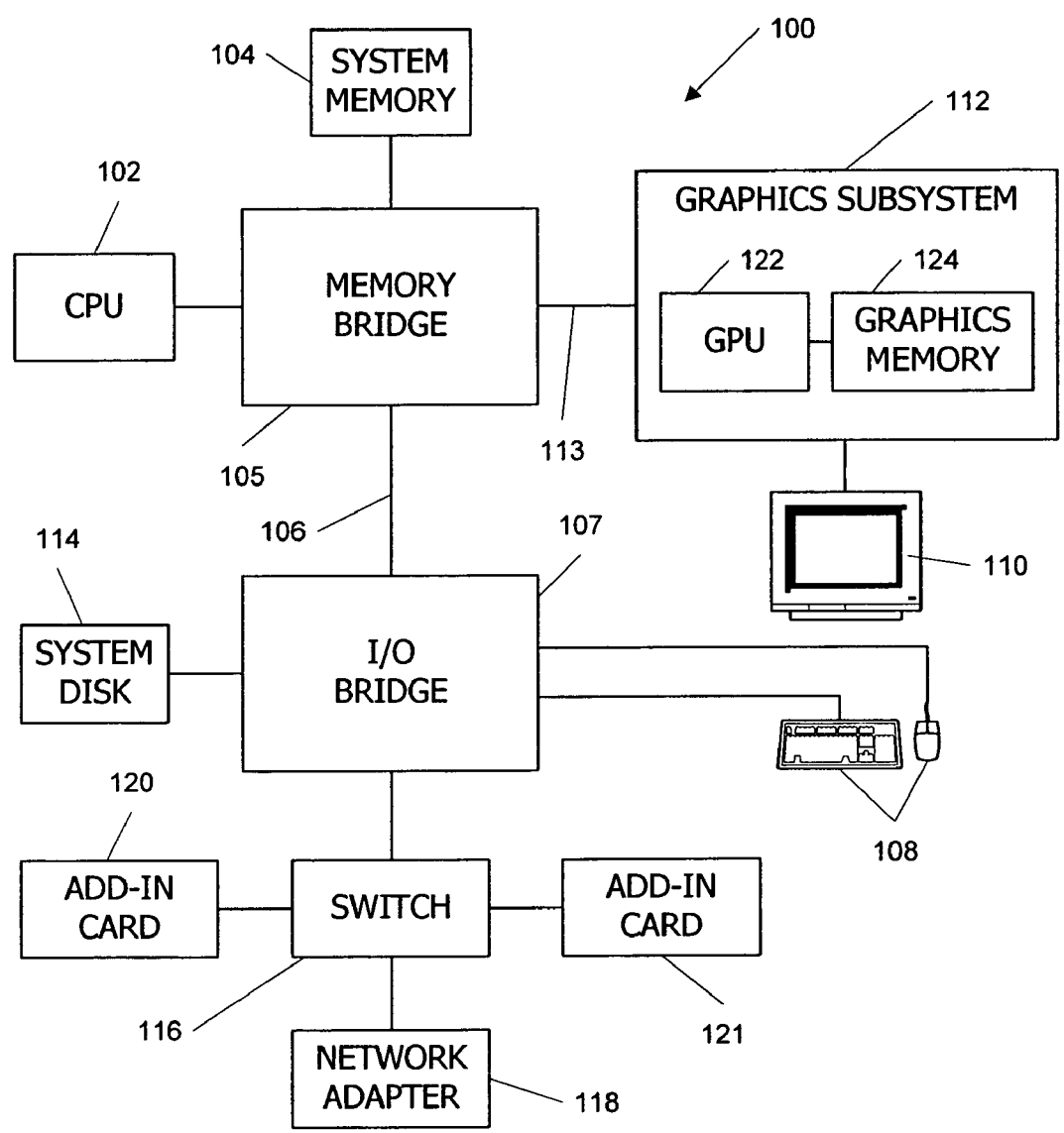
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to I/O bridge 107 via a bus 113. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, little or no dedicated graphics memory is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
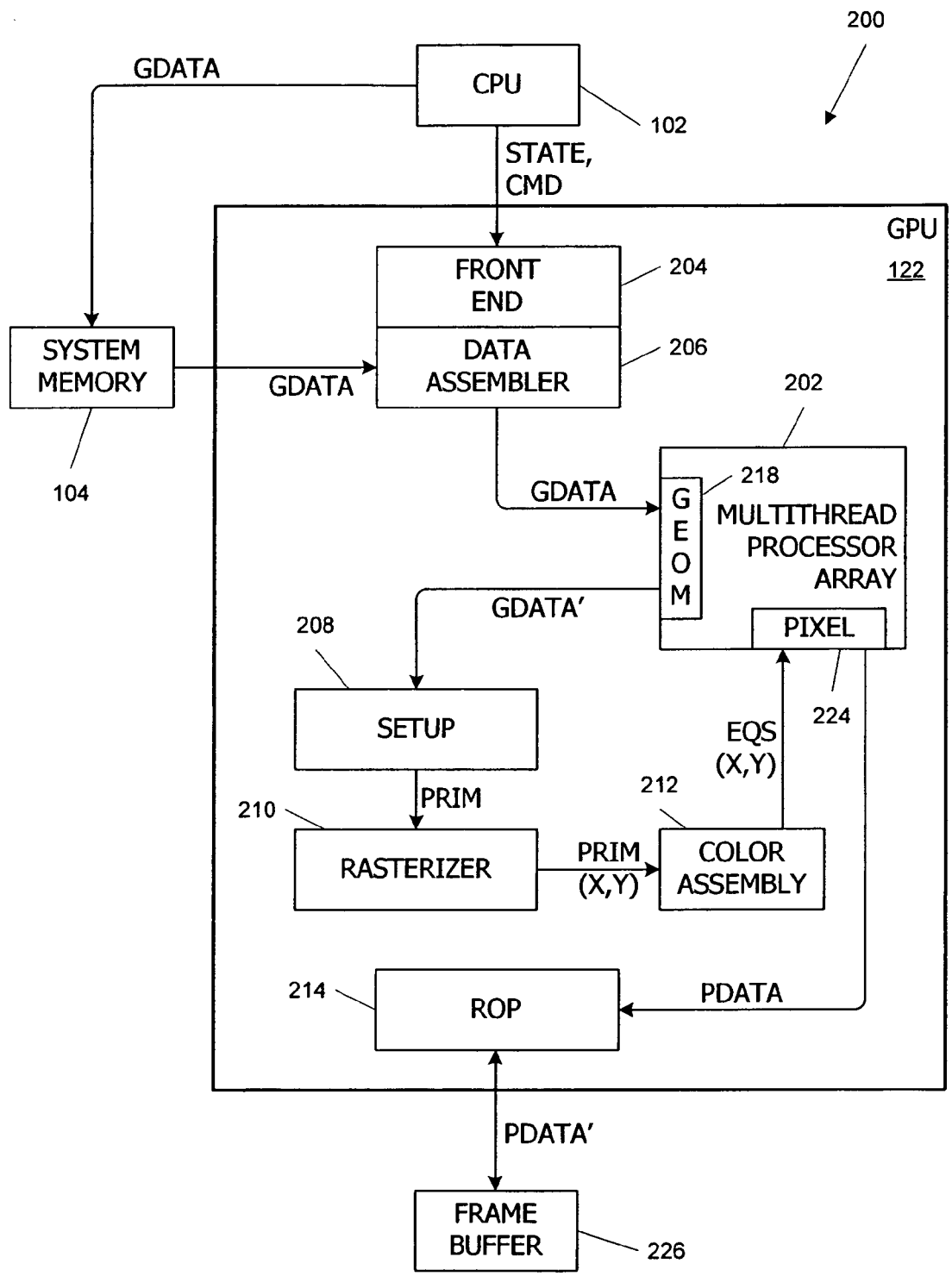
FIG. 2 is a block diagram of a rendering pipeline that can be implemented in the GPU of FIG. 1 according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operate as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a vertex shader program to interpolate a value for the attribute at any location within the primitive; conventional techniques can be used to generate the equations. For instance, in one embodiment, color assembly module 212 generates coefficients A, B and C for a plane equation of the form $U=Ax+By+C$ for each attribute U.

Color assembly module 212 provides the attribute equations (EQS, which may be e.g., the plane-equation coefficients A, B and C) for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operate as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

Multithreaded Core Array Configuration

Figure 3:
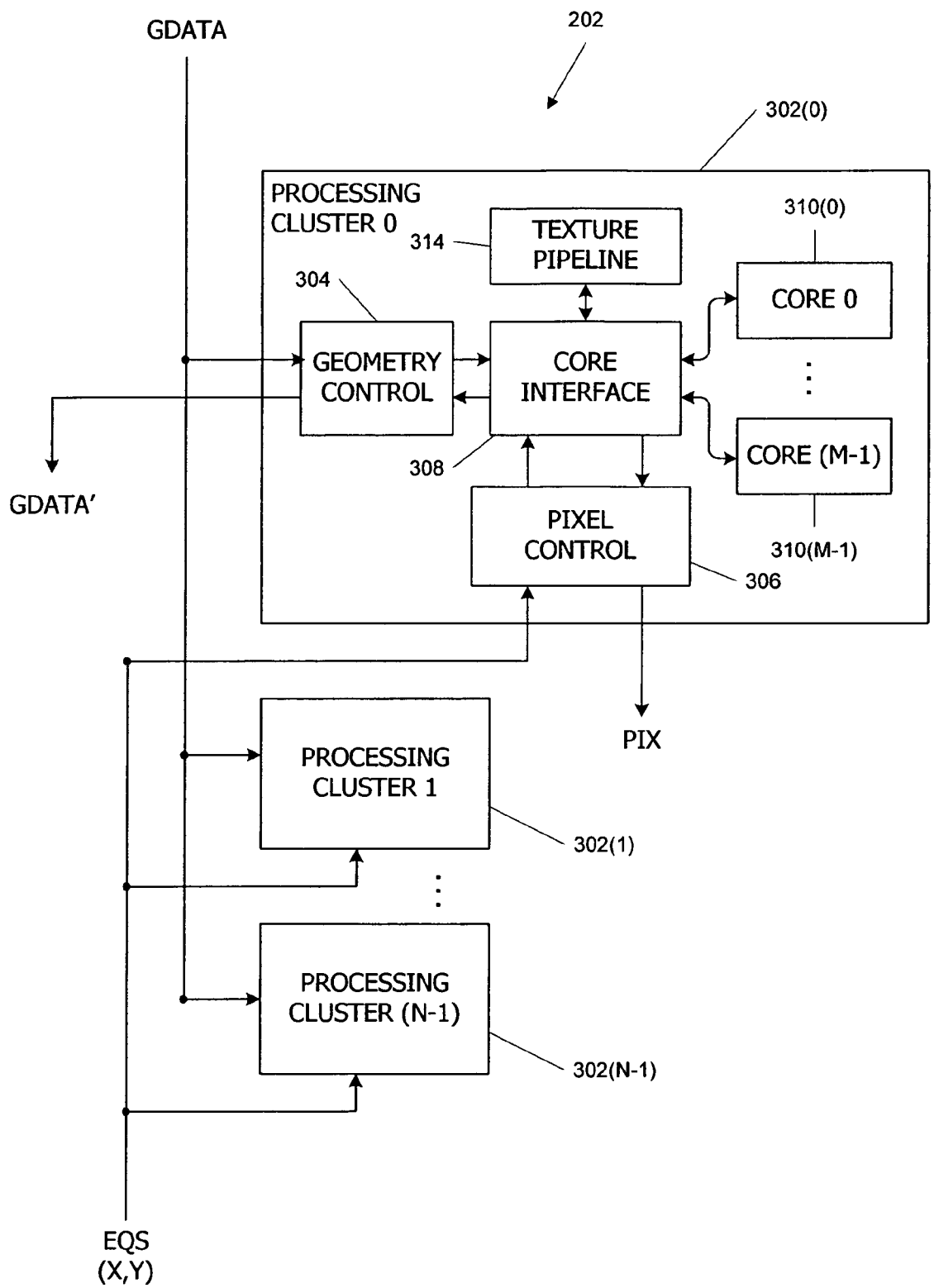
FIG. 3 is a block diagram of a multithreaded processor array according to an embodiment of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention.

In this embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads. An example architecture for a representative core 310 is described below with reference to FIG. 4.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(o) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Core Architecture

Figure 4:
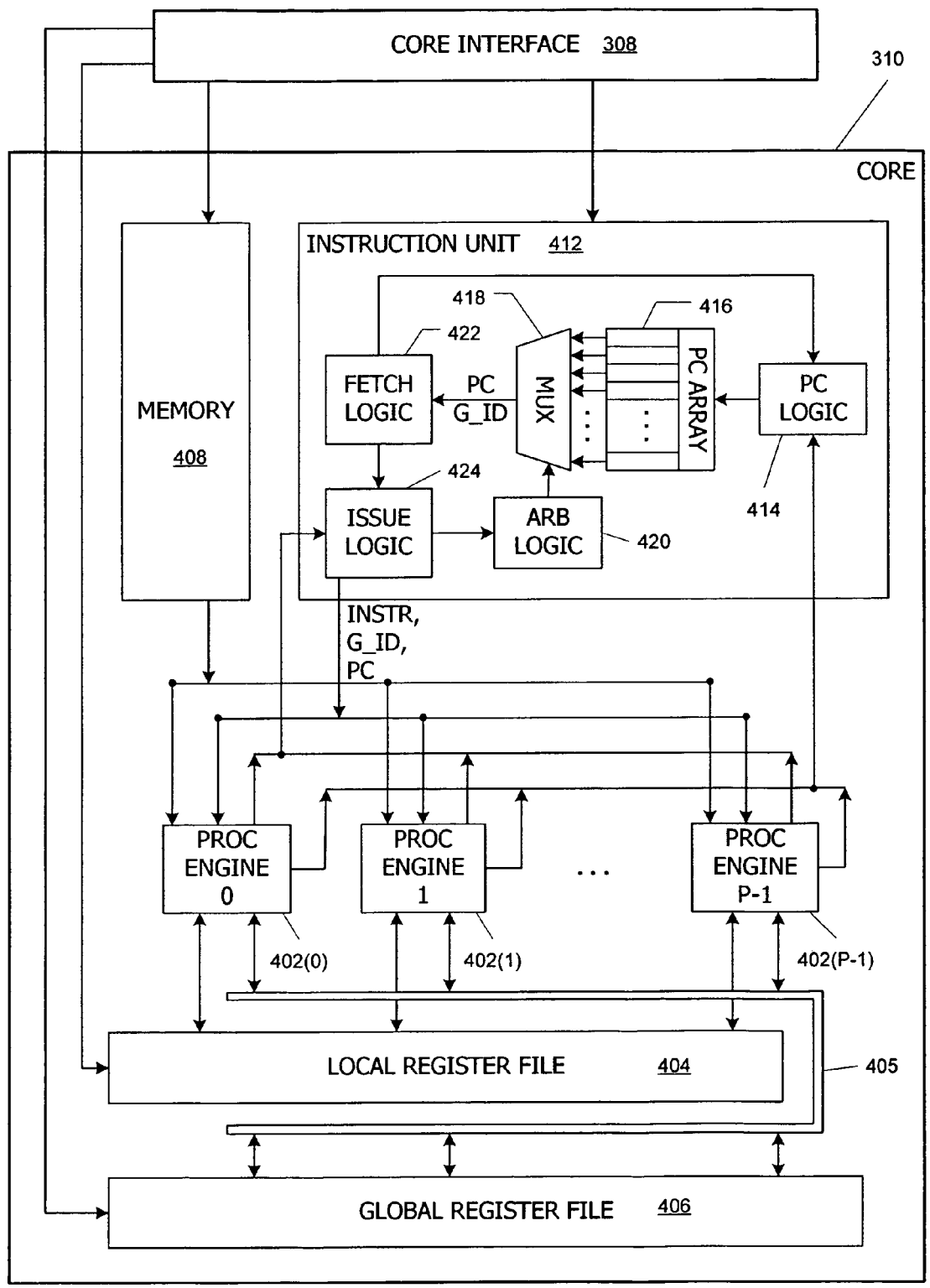
FIG. 4 is a block diagram of a core according to an embodiment of the present invention.

FIG. 4 is a block diagram of a core 310 according to an embodiment of the present invention. Core 310 is advantageously configured to execute a large number of threads in parallel, where the term "thread" refers to an instance of a particular program executing on a particular set of input data. For example, a thread can be an instance of a vertex shader program executing on the attributes of a single vertex or a pixel shader program executing on a given primitive and pixel. In some embodiments, single-instruction, multiple-data (SIMD) instruction issue techniques are used to support parallel execution of a large number of threads without providing multiple independent instruction fetch units.

In one embodiment, core 310 includes an array of P (e.g., 16) parallel processing engines 402 configured to receive SIMD instructions from a single instruction unit 412. Each parallel processing engine 402 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 402 is allocated space in a local register file 404 for storing its local input data, intermediate results, and the like. In one embodiment, local register file 404 is physically or logically divided into P lanes, each having some number of entries (where each entry might be, e.g., a 32-bit word). One lane is allocated to each processing unit, and corresponding entries in different lanes can be populated with data for corresponding thread types to facilitate SIMD execution. The number of entries in local register'file 404 is advantageously large enough to support multiple concurrent threads per processing engine 402.

Each processing engine 402 also has access, via a crossbar switch 405, to a global register file 406 that is shared among all of the processing engines 402 in core 310. Global register file 406 may be as large as desired, and in some embodiments, any processing engine 402 can read to or write from any location in global register file 406. In addition to global register file 406, some embodiments also provide an on-chip shared memory 408, which may be implemented, e.g., as a conventional RAM. On-chip memory 408 is advantageously used to store data that is expected to be used in multiple threads, such as coefficients of attribute equations, which are usable in pixel shader programs. In some embodiments, processing engines 402 may also have access to additional off-chip shared memory (not shown), which might be located, e.g., within graphics memory 124 of FIG. 1.

In one embodiment, each processing engine 402 is multi-threaded and can execute up to some number G (e.g., 24) of threads concurrently, e.g., by maintaining current state information associated with each thread in a different portion of its allocated lane in local register file 404. Processing engines 402 are advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on.

Instruction unit 412 is configured such that, for any given processing cycle, the same instruction (INSTR) is issued to all P processing engines 402. Thus, at the level of a single clock cycle, core 310 implements a P-way SIMD microarchitecture. Since each processing engine 402 is also multi-threaded, supporting up to G threads, core 310 in this embodiment can have up to P*G threads in flight concurrently. For instance, if P=16 and G=24, then core 310 supports up to 384 concurrent threads.

Because instruction unit 412 issues the same instruction to all P processing engines 402 in parallel, core 310 is advantageously used to process threads in "SIMD groups." As used herein, a "SIMD group" refers to a group of up to P threads of execution of the same program on different input data, with one thread of the group being assigned to each processing engine 402. For example, a SIMD group might consist of P vertices, each being processed using the same vertex shader program. (A SIMD group may include fewer than P threads, in which case some of processing engines 402 will be idle during cycles when that SIMD group is being processed.) Since each processing engine 402 can support up to G threads, it follows that up to G SIMD groups can be in flight in core 310 at any given time.

On each clock cycle, one instruction is issued to all P threads making up a selected one of the G SIMD groups. To indicate which thread is currently active, a "group index" (GID) for the associated thread may be included with the instruction. Processing engine 402 uses group index GID as a context identifier, e.g., to determine which portion of its allocated lane in local register file 404 should be used when executing the instruction. Thus, in a given cycle, all processing engines 402 in core 310 are nominally executing the same instruction for different threads in the same group.

It should be noted that although all threads within a group are executing the same program and are initially synchronized with each other, the execution paths of different threads in the group might diverge during the course of executing the program. For instance, a conditional branch in the program might be taken by some threads and not taken by others. Each processing engine 402 advantageously maintains a local program counter (PC) value for each thread it is executing; if an instruction for a thread is received that does not match the local PC value for that thread, processing engine 402 simply ignores the instruction (e.g., executing a no-op).

Instruction unit 412 advantageously manages instruction fetch and issue for each SIMD group so as to ensure that threads in a group that have diverged eventually resynchronize. In one embodiment, instruction unit 412 includes program counter (PC) logic 414, a program counter register array 416, a multiplexer 418, arbitration logic 420, fetch logic 422, and issue logic 424. Program counter register array 416 stores G program counter values (one per SIMD group), which are updated independently of each other by PC logic 414. PC logic 414 updates the PC values based on information received from processing engines 402 and/or fetch logic 422. PC logic 414 is advantageously configured to track divergence among threads in a SIMD group and to select instructions in a way that ultimately results in the threads resynchronizing.

Fetch logic 422, which may be of generally conventional design, is configured to fetch an instruction corresponding to a program counter value PC from an instruction store (not shown) and to provide the fetched instructions to issue logic 424. In some embodiments, fetch logic 422 (or issue logic 424) may also include decoding logic that converts the instructions into a format recognizable by processing engines 402.

Arbitration logic 420 and multiplexer 418 determine the order in which instructions are fetched. More specifically, on each clock cycle, arbitration logic 420 selects one of the G possible group indices GID as the SIMD group for which a next instruction should be fetched and supplies a corresponding control signal to multiplexer 418, which selects the corresponding PC. Arbitration logic 420 may include conventional logic for prioritizing and selecting among concurrent threads (e.g., using round-robin, least-recently serviced, or the like), and selection may be based in part on feedback information from fetch logic 422 or issue logic 424 as to how many instructions have been fetched but not yet issued for each SIMD group.

Fetch logic 422 provides the fetched instructions, together with the group index GID and program counter value PC, to issue logic 424. In some embodiments, issue logic 424 maintains a queue of fetched instructions for each in-flight SIMD group. Issue logic 424, which may be of generally conventional design, receives status information from processing engines 402 indicating which SIMD groups are ready to execute a next instruction. Based on this information, issue logic 424 selects a next instruction to issue and issues the selected instruction, together with the associated PC value and GID. Each processing engine 402 either executes or ignores the instruction, depending on whether the PC value corresponds to the next instruction in its thread associated with group index GID.

In one embodiment, instructions within a SIMD group are issued in order relative to each other, but the next instruction to be issued can be associated with any one of the SIMD groups. For instance, if in the context of one SIMD group, one or more processing engines 402 are waiting for a response from other system components (e.g., off-chip memory or texture pipeline 314 of FIG. 3), issue logic 424 advantageously selects a group index GID corresponding to a different SIMD group.

For optimal performance, all threads within a SIMD group are advantageously launched on the same clock cycle so that they begin in a synchronized state. In one embodiment, core interface 308 advantageously loads a SIMD group into core 310, then instructs core 310 to launch the group. "Loading" a group includes supplying instruction unit 412 and processing engines 402 with input data and other parameters required to execute the applicable program. For example, in the case of vertex processing, core interface 308 loads the starting PC value for the vertex shader program into a slot in PC array 416 that is not currently in use; this slot corresponds to the group index GID assigned to the new SIMD group that will process vertex threads. Core interface 308 allocates sufficient space in the local register file for each processing engine 402 to execute one vertex thread, then loads the vertex data. In one embodiment, all data for the first vertex in the group is loaded into the lane of local register file 404 allocated to processing engine 402(0), all data for the second vertex is in the lane of local register file 404 allocated to processing engine 402(1), and so on. In some embodiments, data for multiple vertices in the group can be loaded in parallel, as described below.

Once all the data for the group has been loaded, core interface 308 launches the SIMD group by signaling to instruction unit 412 to begin fetching and issuing instructions corresponding to the group index GID of the new group. SIMD groups for geometry and pixel threads can be loaded and launched in a similar fashion. Examples of loading and launching logic for various types of threads are described below.

It will be appreciated that the streaming multiprocessor architecture described herein is illustrative and that variations and modifications are possible. Any number of processing units may be included. In some embodiments, each processing unit has its own local register file, and the allocation of local register file entries per thread can be fixed or configurable as desired.

In some embodiments, core 310 is operated at a higher clock rate than core interface 308, allowing the streaming processor to process more data using less hardware in a given amount of time. For instance, core 310 can be operated at a clock rate that is twice the clock rate of core interface 308. If core 310 includes P processing engines 402 producing data at twice the core interface clock rate, then core 310 can produce 2*P results per core interface clock. Provided there is sufficient space in local register file 404, from the perspective of core interface 308, the situation is effectively identical to a core with 2*P processing units. Thus, P-way SIMD parallelism could be produced either by including P processing units in core 310 and operating core 310 at the same clock rate as core interface 308 or by including P/2 processing units in core 310 and operating core 310 at twice the clock rate of core interface 308. Other timing variations are also possible.

In another alternative embodiment, SIMD groups containing more than P threads ("supergroups") can be defined. A supergroup is defined by associating the group index values of two (or more) of the SIMD groups (e.g., GID1 and GID2) with each other. When issue logic 424 selects a supergroup, it issues the same instruction twice on two successive cycles: on one cycle, the instruction is issued for GID1, and on the next cycle, the same instruction is issued for GID2. Thus, the supergroup is in effect a SIMD group. Supergroups can be used to reduce the number of distinct program counters, state definitions, and other per-group parameters that need to be maintained without reducing the number of concurrent threads.

Changing States and Contexts in a Graphics Processing System

As used herein, "state information" is any information, other than the input data to be processed, that is relevant to defining a thread. State information includes resource requirements, configurable parameters, and identifiers of programs to be executed. The same state is usually applied to multiple threads, but the state can change from time to time. Examples of state information are: texture information that might be applied to a primitive that is processed by many pixel threads; a coordinate transform matrix that might be applied to many vertices each of which is processed in a separate thread; the starting program counter information identifying a shader program to be executed in a vertex or pixel thread; etc.

Collectively, the state information provides a "context" in which a given thread (or SIMD group) executes. A "state vector" or "context vector" is a collection of all the state information for a particular thread to be executed. Each type of thread (e.g., a vertex shader (VS), geometry shader (GS), or pixel shader (PS) thread) will have its own context, defined by the state information applicable to that thread.

It is desirable to avoid loading all the state information into local register file 404 for each thread, because the state information is often the same for different threads of the same type. Loading the same state information into multiple registers would be redundant. One alternative is to use a master register, accessible to all the processing engines, to store the state information. When a change in state occurs, the core would need to be drained by allowing existing threads to finish but not launching any new threads. The master register can then be updated with new state information, after which new threads can be launched. If the state changes infrequently, this procedure might be acceptable. However, if the state changes frequently, substantial inefficiency may result.

Managing Multiple State Vectors

In one embodiment of the present invention, a per-group state register is provided for each SIMD group that can be concurrently executing in the core. A separate master register is provided that can be updated with new state information at any time without affecting threads that are currently executing. When a thread group is created, the current content of the master register is copied into the per-group state register for the new group. The processing engines are configured to read any state information needed during thread execution from the appropriate per-group state register.

In another embodiment of the present invention, multiple master registers are used to store and update state information for different thread types (e.g., VS, GS, and PS). The state information from one master register is copied to the per-group state register for a new SIMD group based on the type of threads to be executed in the SIMD group. In this embodiment, in addition to supporting concurrent SIMD groups of the same thread type with different contexts, the core can also support more than one thread type at a time, resulting in increased flexibility.

Using One Master Register to Manage Multiple State Vectors

Figure 5:
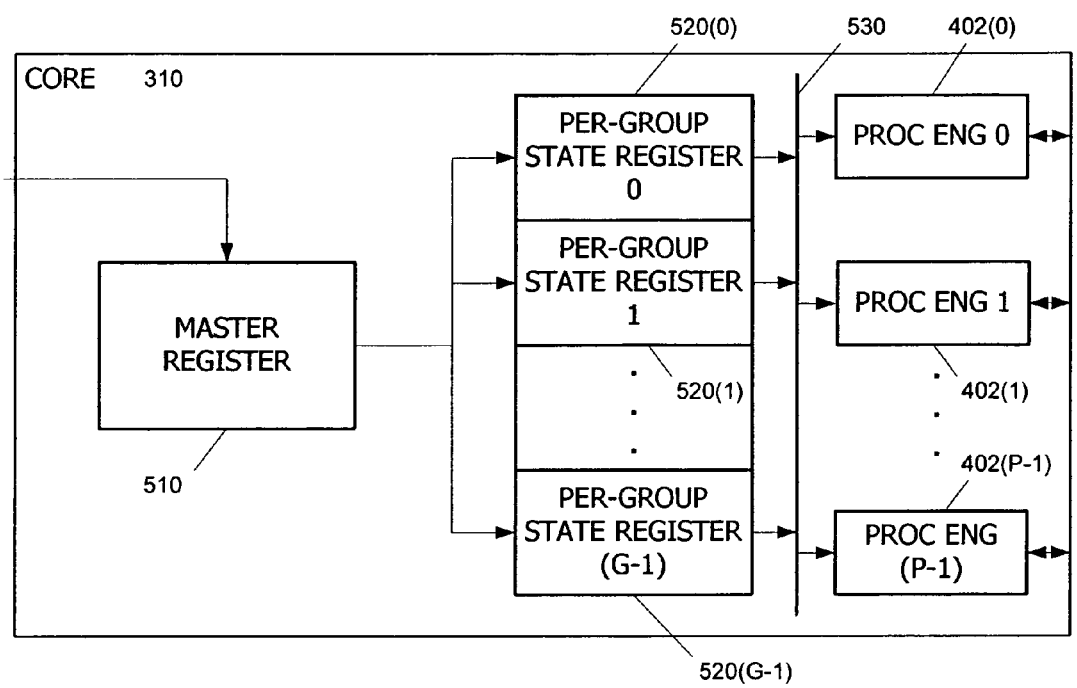
FIG. 5 is a block diagram of state registers in a core according to an embodiment of the present invention.

FIG. 5 is a block diagram of state registers in core 310 according to an embodiment of the present invention. A state vector is stored in a master register 510. In FIG. 5, master register 510 is used to store state information for vertex shader (VS), geometry shader (GS), or pixel shader (PS) threads. It should be appreciated that master register 510 can also store state information related to general purpose computations unrelated to graphics processing.

A set of per-group state registers 520 is coupled to master register 510. In one embodiment of the present invention, the creation of a SIMD group involves loading input data for all threads of a SIMD group into core 310, then launching the SIMD group. During creation of the group, the group is assigned a group index (GID), and the state vector stored in master register 510 is copied to the corresponding slot 520 (GID) within per-group state register 520. It should be appreciated that data in master register 510 can be copied to any slot in per-group state register 520. Processing engines 402 are coupled to a broadcast bus 530 which allows all of the processing engines 402 to access any per-group state register to retrieve state information when needed during execution of a SIMD group.

At a given time, a processing engine 402 executes instructions for threads in a SIMD group having a group index GID. If the instructions require state information, processing engine 402 reads the state information from the per-group state register 520 corresponding to the group index GID. While the per-group state register 520 is being used by the processing engine executing the SIMD group, the state vector stored in master register 510 may be updated without affecting per-group state registers 520. Then, during creation of a new SIMD group, the updated state vector may be copied to the slot within per-group state register 520 associated with that group. Thus, it is not necessary to drain the core in order to change state information. This process may continue so that a large number (up to G) of different thread groups with different state vectors can be executed concurrently.

Using a Group of Master Registers to Manage Multiple State Vectors

Figure 6:
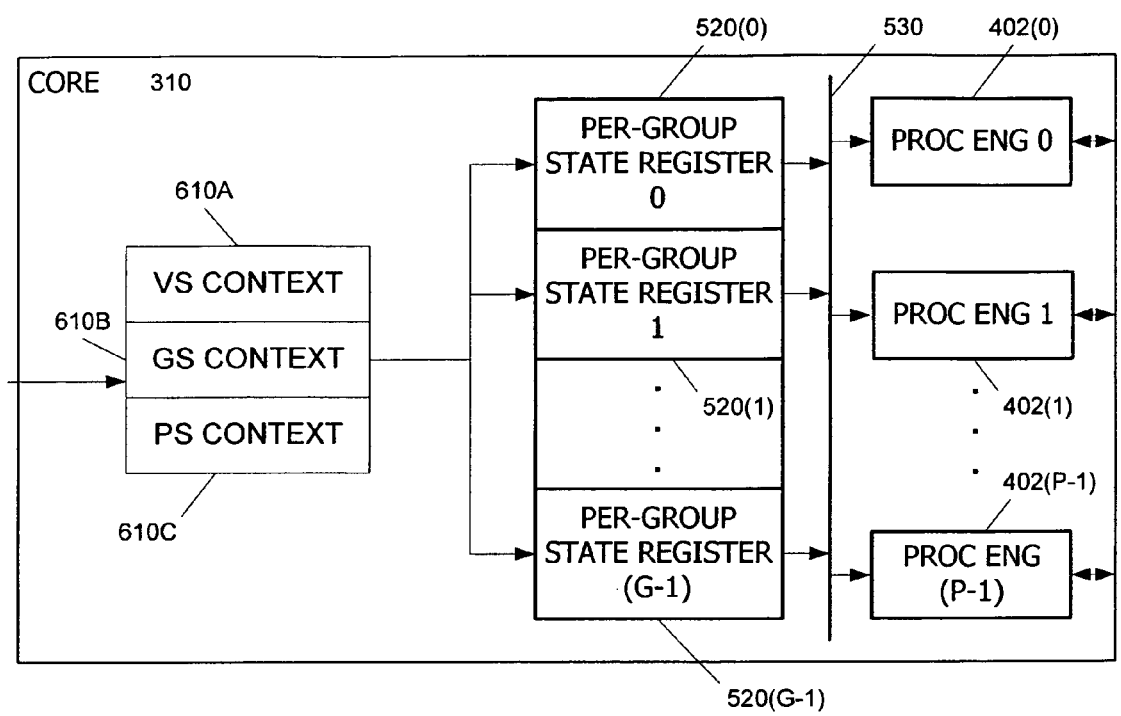
FIG. 6 is a block diagram of a group of master registers in a core according to an embodiment of the present invention.

FIG. 6 is a block diagram of a group of master registers in core 310 according to an embodiment of the present invention. In this embodiment, a vertex shader (VS) master register 610A, geometry shader (GS) master register 610B, and a pixel shader (PS) master register 610C store state information that can be copied to per-group state registers 520. It should be appreciated that these master registers may be physically or logically separated. Vertex shader state vectors are loaded into VS master register 610A, geometry shader state vectors are loaded into GS master register 610B, and pixel shader state vectors are loaded into PS master register 610C. Each of these state vectors can be independently updated as new state information is received. For example, suppose that slot 520 (0) of per-group state register 520 contains state information Q for a VS thread group. Suppose that the next thread group to be executed is also a VS group, but it has state information Q', Q' having one or more changes with respect to Q. VS master register 610A can be updated (from Q to Q') at any time after state information Q has been copied to per-group state register 520(0), and state information Q' can be copied to a different per-group state register, e.g., register 520(1), at any time before the second group is launched. It should also be appreciated that multiple slots within per-group state register 520 may contain the same state information.

As described above with reference to FIG. 5, during creation of the group, the group is assigned a group index (GID), and the state vector stored in one of the master registers 610A, 610B, 610C is copied to the corresponding slot 520(GID). It should be appreciated that data in any one of master registers 610A, 610B, 610C can be copied to any slot in per-group state register 520. Processing engines 402 are coupled to a broadcast bus 530 which allows all of the processing engines 402 to access any per-group state register to retrieve state information when needed during execution of a SIMD group.

At a given time, a processing engine executes instructions for thread in a SIMD group having a group index GID. If the instructions require state information, the processing engine reads the state information from the per-group state register corresponding to the group index GID. In this embodiment, SIMD groups of different types (e.g., VS, PS, or GS) may be launched in any order; as each new group is created, the appropriate state vector is copied from one of master registers 610A, 610B, 610C to the per-group state register 520 assigned to the new group. State information for any of the thread types can be updated as needed, with each update being applied to thread groups launched after the update is received and stored in the appropriate master register 610A, 610B, 610C.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. An apparatus for processing data, the apparatus comprising:
 a multi-threaded processing core including:
  a plurality of processing engines configured to execute a thread group;
  a master register configured to store and update state information for each of a plurality of thread types, wherein the state information in the master register can be updated at any time without affecting currently running threads; and
  a per-group state register coupled to the master register, wherein, during a creation of a new thread group to be executed by the plurality of processing engines, the state information pertaining to threads of the new thread group is copied to the per-group state register from the master register,
  wherein during execution of the new thread group by the plurality of processing engines, each of the plurality of processing engines reads the state information from the per-group state register.

2. The apparatus of claim 1, wherein the plurality of thread types includes a vertex shader thread type, a geometry shader thread type, and a pixel shader thread type.

3. The apparatus of claim 1, wherein the plurality of thread types includes a general purpose computation thread type.

4. The apparatus of claim 1, wherein the multi-threaded processing core includes: a plurality of per-group state registers coupled to the master register, wherein, for each per-group state register, during a creation of a new thread group, a vector of the state information pertaining to threads of the new thread group is copied to the per-group register from the master register, wherein the new thread will be executed by the plurality of processing engines and the plurality of processing engines will access the per-group state register.

5. The apparatus of claim 4, wherein the vector includes:
 at least one of a starting counter value, a number of attributes to process, or a transformation matrix value.

6. The apparatus of claim 4, wherein the vector further includes a value indicating an amount of space needed in a local register file to execute the thread group.

7. The apparatus of claim 1, wherein the state information stays in the per-group state register until execution of the new thread group by the processing engine is completed.

8. An apparatus for processing data, the apparatus comprising:
- a multi-threaded processing core including:
  - a plurality of processing engines configured to execute a plurality of thread groups;
  - a plurality of master registers configured to store and update state information for a plurality of thread types, wherein the state information in the master register can be updated at any time without affecting currently running threads; and
  - a plurality of per-group state registers coupled to the plurality of master registers, wherein, during a creation of a new thread group to be executed by the plurality of processing engines, the state information stored in one of the master registers and pertaining to threads of the new thread group is copied to one of the per-group state registers,
  - wherein the plurality of master registers exclusively provide state information to the plurality of per-group state registers in the multi-threaded processing core, and
  - wherein during execution of the new thread group, each of the plurality of processing engines reads the state information from one of the per-group state registers.

9. The apparatus of claim 8, wherein the plurality of thread types includes a vertex shader thread type, a geometry shader thread type, and a pixel shader thread type.

10. The apparatus of claim 8, wherein the state information stays in the per-group state register until execution of the new thread group by the processing engine is completed.

11. A method of processing data comprising:
- receiving updated state information defining a data processing context;
- updating the state information for each of a plurality of thread types in a master register, wherein the master register may be updated at any time without affecting any executing thread;
  - forwarding the state information from the master register to a first per-group state register during a creation of a first thread group; and
  - executing the first thread group by a plurality of processing engines,
- wherein during execution of the thread group, each of the plurality of processing engines reads the state information from the first per-group state register.

12. The method of claim 11, further comprising:
- updating the state information in the master register while the first thread group is being executed.

13. The method of claim 12, further comprising:
- forwarding the updated state information to a second per-group state register during a creation of a second thread group, wherein the second thread group is executed concurrently with the first thread group.

* * * * *